United States Patent
Hayashi et al.

(10) Patent No.: US 8,754,167 B2
(45) Date of Patent: Jun. 17, 2014

(54) ACTINIC-LIGHT-CURABLE COMPOSITION, MOLDED POLYCARBONATE RESIN OBJECT WITH A CURED FILM, AND MANUFACTURING METHOD THEREFOR

(75) Inventors: Hidetaka Hayashi, Kariya (JP); Toshihisa Shimo, Kariya (JP); Kyoko Kumagai, Kariya (JP); Tetsuya Mitsuoka, Kariya (JP); Naoharu Ueda, Kariya (JP); Naohiro Hamada, Tokyo (JP); Toru Oya, Tokyo (JP); Satoshi Maeda, Tokyo (JP); Toshifumi Midorikawa, Tokyo (JP); Takenobu Nakano, Tokyo (JP)

(73) Assignee: Kabushiki Kaisha Toyota Jidoshokki, Aichi (JP)

( * ) Notice: Subject to any disclaimer, the term of this patent is extended or adjusted under 35 U.S.C. 154(b) by 83 days.

(21) Appl. No.: 13/583,870

(22) PCT Filed: Jan. 26, 2011

(86) PCT No.: PCT/JP2011/051415
§ 371 (c)(1),
(2), (4) Date: Oct. 11, 2012

(87) PCT Pub. No.: WO2011/111428
PCT Pub. Date: Sep. 15, 2011

(65) Prior Publication Data
US 2013/0034735 A1  Feb. 7, 2013

(30) Foreign Application Priority Data
Mar. 12, 2010 (JP) ................ P2010-056052

(51) Int. Cl.
B05D 3/06 (2006.01)
C08K 3/36 (2006.01)

(52) U.S. Cl.
USPC .......... 524/789; 524/544; 524/548; 524/558; 427/521

(58) Field of Classification Search
CPC .......... B32B 27/30; C08F 290/12; C08J 7/04; C09D 4/00
USPC ................. 427/521; 524/544, 548, 558, 789
See application file for complete search history.

(56) References Cited

FOREIGN PATENT DOCUMENTS

| CN | 101423737 A | 5/2009 |
|----|-------------|--------|
| JP | 11-78515 A  | 3/1999 |
| JP | 2000-128940 A | 5/2000 |
| JP | 2000-159828 A | 6/2000 |

(Continued)

OTHER PUBLICATIONS

Machine translation of JP 2009-013337A (Jan. 22, 2009).*

(Continued)

*Primary Examiner* — Vu A Nguyen
(74) *Attorney, Agent, or Firm* — Sughrue Mion, PLLC

(57) ABSTRACT

Disclosed is an active energy ray-curing composition containing an active energy ray-curing prepolymer (A) obtainable by a reaction of an acrylic-based prepolymer having a hydroxyl group and an acrylic monomer (a4) having an isocyanate group, an active energy ray-curing compound (B) having a benzotriazole group, another active energy ray-curing compound (C) differing from the (A) component and the (B) component, and inorganic oxide particles (D). The acrylic-based prepolymer having the hydroxyl group is a copolymer that includes an acrylic monomer (a1) having a piperidinyl group, an acrylic monomer (a2) having a hydroxyl group, etc., as monomer units.

18 Claims, 1 Drawing Sheet

(56) References Cited

FOREIGN PATENT DOCUMENTS

| | | |
|---|---|---|
| JP | 2003-311908 A | 11/2003 |
| JP | 2004-27110 A | 1/2004 |
| JP | 2007-186573 A | 7/2007 |
| JP | 2007-238823 A | 9/2007 |
| JP | 2009-13337 A | 1/2009 |

OTHER PUBLICATIONS

Chinese Office Action for corresponding CN Patent Application No. 201180013256.0 mailed Jul. 31, 2013.
International Search Report for PCT/JP2011/051415 dated Apr. 5, 2011.
International Preliminary Report on Patentability issued on Oct. 11, 2012 in counterpart PCT Application No. PCT/JP2011/051415.

* cited by examiner

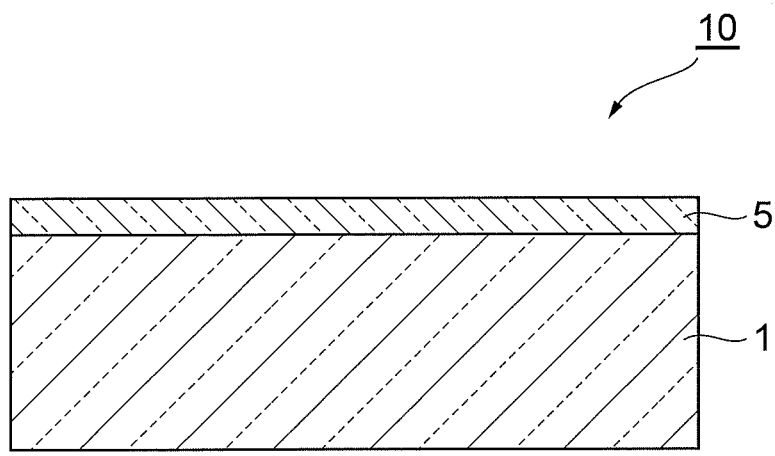

ACTINIC-LIGHT-CURABLE COMPOSITION, MOLDED POLYCARBONATE RESIN OBJECT WITH A CURED FILM, AND MANUFACTURING METHOD THEREFOR

CROSS REFERENCE TO RELATED APPLICATIONS

This application is a National Stage of International Application No. PCT/JP2011/051415 filed Jan. 26, 2011, claiming priority based on Japanese Patent Application No. 2010-056052 filed Mar. 12, 2010, the contents of all of which are incorporated herein by reference in their entirety.

TECHNICAL FIELD

The present invention relates to an active energy ray-curing composition, polycarbonate resin molded body with cured film, and a manufacturing method therefor.

BACKGROUND ART

Recently, use of a transparent resin plate in place of a glass plate as a window member in contact with the outdoors in a building, etc., is being proposed. In particular, an aromatic-polycarbonate-based transparent resin plate is excellent in fracture resistance, transparency, lightness, workability, etc., and is thus a promising material for a window member.

A window member is required to have weather resistance. Also, various forms of friction and other external forces are applied to a surface of a window member. A window member is thus required to exhibit high anti-wear performance. In comparison to a glass plate, a transparent resin plate is low in surface hardness and thus readily loses transparency by becoming flawed or worn. There was thus a limit to using a transparent resin plate as a window member.

Thus, normally a hard coat layer having weather resistance and wear resistance is laminated on a surface of a transparent resin plate proposed for use as a window member (Patent Literature 1 to 4). A coating agent for forming a hard coat layer of excellent weather resistance has also been proposed (Patent Literature 5 and 6).

CITATION LIST

Patent Literature

Patent Literature 1: Japanese Patent Application Laid-Open No. H11-78515
Patent Literature 2: Japanese Patent Application Laid-Open No. 2003-311908
Patent Literature 3: Japanese Patent Application Laid-Open No. 2004-27110
Patent Literature 4: Japanese Patent Application Laid-Open No. 2007-186573
Patent Literature 5: Japanese Patent Application Laid-Open No. 2000-159828
Patent Literature 6: Japanese Patent Application Laid-Open No. 2007-238823

SUMMARY OF INVENTION

Technical Problem

However, requirement levels related to weather resistance and wear resistance are becoming high and there is an issue that a conventional coating composition is not necessarily adequate in weather resistance and wear resistance.

Thus, an object of the present invention is to provide an active energy ray-curing composition capable of forming a cured film of adequately excellent weather resistance and wear resistance. Another object of the present invention is to provide a polycarbonate resin molded body with cured film that includes a cured film having adequately excellent weather resistance and wear resistance and a manufacturing method therefor.

Solution to Problem

An active energy ray-curing composition according to the present invention contains an active energy ray-curing prepolymer (A) obtainable by a reaction of an acrylic-based prepolymer having a hydroxyl group and an acrylic monomer (a4) having an isocyanate group and a (meth)acryloyl group, an active energy ray-curing compound (B) having a benzotriazole group and a (meth)acryloyl group, another active energy ray-curing compound (C) having a (meth)acryloyl group and differing from the (A) component and the (B) component, and inorganic oxide particles (D). The acrylic-based prepolymer having the hydroxyl group is a copolymer that includes an acrylic monomer (a1) having a piperidinyl group and a (meth)acryloyl group, an acrylic monomer (a2) having a hydroxyl group and a (meth)acryloyl group, and another monomer (a3) as monomer units.

By the active energy ray-curing composition according to the present invention, a cured film of adequately excellent weather resistance and wear resistance can be formed.

Preferably, the active energy ray-curing prepolymer (A) has a number average molecular weight of 3000 to 100000. Preferably, the active energy ray-curing prepolymer (A) has a (meth)acryloyl group equivalent of 250 to 1600.

Preferably, the acrylic monomer (a3) includes a compound having a functional group that contains a fluorine atom. The functional group is preferably a perfluoroalkyl group.

The active energy ray-curing compound (C) preferably includes a compound (C1) having a (meth)acryloyl group and a group expressed by $-(CH_2)_5-$. The compound (C1) is preferably a compound expressed by the following general formula (1).

[Chemical Formula 1]

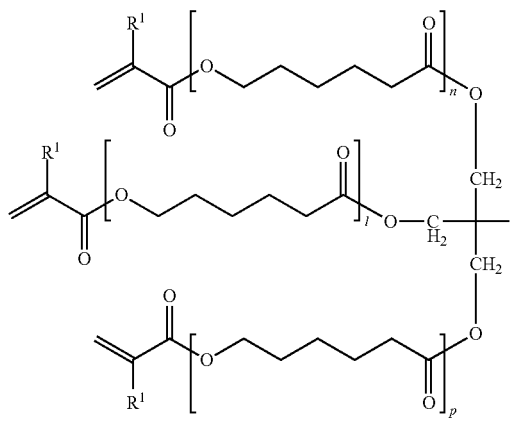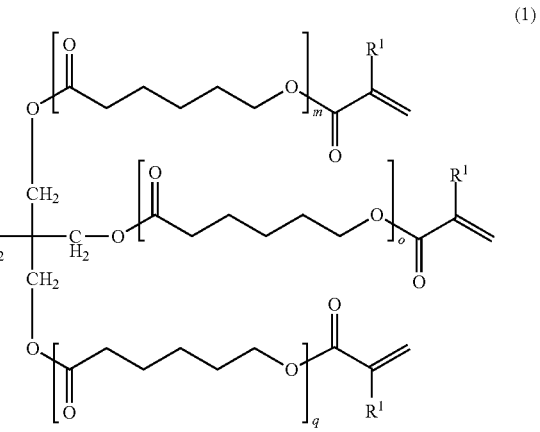

(1)

In formula (1), $R^1$ indicates a hydrogen atom or a methyl group, a plurality of $R^1$ in the same molecule may be the same or different, and n, m, l, o, p, and q indicate integers satisfying n+m+l+o+p+q=1 to 12. Preferably, n, m, l, o, p, and q are integers satisfying n+m+l+o+p+q=6 to 12.

The active energy ray-curing compound (C) preferably further includes a compound (C2) having a (meth)acryloyl group and no group expressed by —$(CH_2)_5$—. The compound (C2) is preferably a urethane compound having an average of 2 to 15 (meth)acryloyl groups and a urethane group. The compound (C2) preferably has a number average molecular weight of 500 to 10000.

The active energy ray-curing compound (C) preferably further includes a silicone oil (C3) having a (meth)acryloyl group.

The inorganic oxide particles (D) are preferably $SiO_2$ particles.

Preferably on the basis of the total amount of the (A) component, the (B) component, and the (C) component, a proportion of the (A) component is 1 to 50% by mass, a proportion of the (B) component is 1 to 20% by mass, and a proportion of the (C) component is 30 to 95% by mass.

Preferably on the basis of the total amount of the (A) component, the (B) component, and the (C) component, the proportion of the (A) component is 1 to 50% by mass, the proportion of the (B) component is 1 to 20% by mass, a proportion of the (C1) component is 5 to 60% by mass, a proportion of the (C2) component is 20 to 80% by mass, and a proportion of the (C3) component is 0.01 to 2% by mass.

Preferably with respect to 100 parts by weight of the total amount of the (A) component, the (B) component, and the (C) component, an amount of inorganic oxide particles (D) is 0.1 to 20 parts by weight.

In another aspect, the present invention relates to a polycarbonate resin molded body with cured film. The polycarbonate resin molded body with cured film includes a polycarbonate resin molded body and a cured film disposed on a surface of the polycarbonate resin molded body and formed by curing of the active energy ray-curing composition according to the present invention.

The polycarbonate resin molded body with cured film according to the present invention has adequately excellent weather resistance and wear resistance.

In a further other aspect, the present invention relates to a method for manufacturing the polycarbonate resin molded body with cured film. The manufacturing method according to the present invention includes a step of forming a film of the active energy ray-curing composition on a surface of a polycarbonate resin molded body and a step of curing the formed film by irradiation of active energy rays to form a cured film.

By the manufacturing method according to the present invention, a polycarbonate resin molded body having adequately excellent weather resistance and wear resistance can be obtained.

Advantageous Effects of Invention

By the present invention, a cured film having adequately excellent weather resistance and wear resistance can be obtained. The cured film is also superior in adhesion to a polycarbonate resin molded body, and high adhesion can be maintained after a weather resistance test.

Furthermore, according to the present invention, a polycarbonate resin molded body having adequately excellent weather resistance and wear resistance is provided.

BRIEF DESCRIPTION OF DRAWINGS

FIG. 1 is a sectional view of an embodiment of a polycarbonate resin molded body.

DESCRIPTION OF EMBODIMENTS

A preferred embodiment according to the present invention shall now be described in detail. However, the present invention is not limited to the following embodiment. In the present specification, "(meth)acryloyl group" refers to an acryloyl group or a methacryloyl group, and "(meth)acryloyloxy" refers to an acryloyloxy or methacryloyloxy.

An active energy ray-curing composition according to the present embodiment contains an active energy ray-curing prepolymer (A), an active energy ray-curing compound (B) having a benzotriazole group, another active energy ray-curing compound (C) differing from the (A) component and the (B) component, and inorganic oxide particles (D). The respective components shall be described in detail below.

The prepolymer (A) can be obtained by a reaction of an acrylic-based prepolymer having a hydroxyl group and an acrylic monomer (a4) having an isocyanate group and a (meth)acryloyl group. The prepolymer (A) is formed by reaction of the hydroxyl group of the acrylic-based polymer with the isocyanate group of the acrylic monomer (a4).

The acrylic-based prepolymer that is used to obtain the prepolymer (A) is a copolymer that includes an acrylic monomer (a1) having a piperidinyl group and a (meth)acryloyl group and an acrylic monomer (a2) having a hydroxyl group and a (meth)acryloyl group as monomer units.

The prepolymer (A) has a piperidinyl group derived from the acrylic monomer (a1) and a (meth)acryloyl group derived from the acrylic monomer (a4). By action of the piperidinyl group introduced in the prepolymer (A), the cured film formed is specifically imparted with excellent weather resistance. When the cured film is exposed to ultraviolet rays, chemical bonds of polymer chains making up the cured film are broken and radicals are thereby produced. The produced radicals promote breakage of the chemical bonds in the cured film. The piperidinyl group introduced in the prepolymer (A) is considered to react with the radicals to thereby deactivate the radicals and suppress progress of breakage of chemical bonds in the cured film.

The acrylic monomer (a1) is, for example, at least one kind of compound selected from among 4-(meth)acryloyloxy-2,2,6,6-tetramethylpiperidine and 4-(meth)acryloyloxy-1,2,2,6,6-pentamethylpiperidine.

The hydroxyl group that functions as a point of reaction with the acrylic monomer (a4) is introduced into the acrylic-based prepolymer by the acrylic monomer (a2). The acrylic monomer (a2) is, for example, at least one kind of compound selected from the group consisting of monofunctional (meth)acrylates, such as hydroxyethyl (meth)acrylate, hydroxypropyl (meth)acrylate, hydroxybutyl (meth)acrylate, cyclohexane dimethanol mono(meth)acrylate, 2,3-dihydroxypropyl (meth)acrylate (hydroxy group bifunctional), 2-hydroxy-3-phenoxypropyl (meth)acrylate, N-methylol (meth)acrylamide, hydroxystyrene, hydroquinone mono(meth)acrylate, hydroxyalkyl vinyl ether, and compounds with which any one of the above compounds are ethylene oxide modified (EO modified), propylene oxide modified (PO modified), or caprolactone modified (CL modified), and polyfunctional (meth)acrylates, such as 3-(meth)acryloyloxy-2-hydroxypropyl (meth)acrylate, pentaerythritol tri(meth)acrylate, dipentaerythritol penta(meth)acrylate, isocyanuric acid EO modified di(meth)acrylate, etc.

The acrylic-based prepolymer used for obtaining the prepolymer (A) may further include, as a monomer unit, another monomer (a3) differing from the acrylic monomer (a1) and the acrylic monomer (a2) and having a radical polymerizable functional group, such as a (meth)acryloyl group. The monomer (a3) is, for example, at least one kind of compound selected from the group consisting of methyl (meth)acrylate, ethyl (meth)acrylate, butyl (meth)acrylate, hexyl (meth)acrylate, 2-ethylhexyl (meth)acrylate, lauryl (meth)acrylate, stearyl (meth)acrylate, cyclohexyl (meth)acrylate, benzyl (meth)acrylate, isobornyl (meth)acrylate, dicyclopentanyl (meth)acrylate, 2-methoxyethyl (meth)acrylate, polyethylene glycol alkyl ether (meth)acrylate, polypropylene glycol alkyl ether (meth)acrylate, tetrahydrofurfuryl (meth)acrylate, phenoxyethyl (meth)acrylate, N,N-dimethylaminoethyl (meth)acrylate, N,N-diethylaminoethyl (meth)acrylate, styrene, and methylstyrene.

The monomer (a3) preferably includes a compound having a functional group that contains a fluorine atom. The weather resistance of the cured film can thereby be further improved. As main reasons thereof, the following two are considered.

(1) By incorporation of a C—F bond, which is a stronger bond, in other words, has a higher bond energy than a C—H bond, the chemical bonds in the cured film are made less likely to be broken.

(2) During curing of the film of the composition, the functional group containing the fluorine atom that is introduced in the prepolymer (A) tends to gather and be distributed at a film surface and vicinity thereof, and the piperidinyl group that the prepolymer (A) has thus also tends to be present concentratedly at the film surface and vicinity thereof. Consequently, degradation of the cured film interior is prevented more effectively.

The fluorine-atom-containing functional group may, for example, be a fluorine-substituted alkyl group, aryl group, or aralkyl group. The 2,2,2-trifluoroethyl group, the 2,2,3,3,3-pentafluoropropyl group, the 3,3,4,4,5,5,6,6,7,7,8,8,9,9,10,10,10-heptadecafluorodecyl group, and the pentafluorophenyl group can be cited as specific examples of the functional group.

The compound having the fluorine-atom-containing functional group that is used as the monomer (a3) is, for example, at least one kind of compound selected from the group consisting of 2,2,2-trifluoroethyl (meth)acrylate, 2,2,3,3,3-pentafluoropropyl (meth)acrylate, 2-(perfluorobutyl)ethyl (meth)acrylate, 3-(perfluorobutyl)-2-hydroxypropyl (meth)acrylate, 2-(perfluorohexyl)ethyl (meth)acrylate, 3-(perfluorohexyl)-2-hydroxypropyl (meth)acrylate, 2-(perfluorooctyl)ethyl (meth)acrylate, 3-(perfluorooctyl)-2-hydroxypropyl (meth)acrylate, 2-(perfluorodecyl)ethyl (meth)acrylate, 2-(perfluoro-3-methylbutyl)ethyl (meth)acrylate, 3-(perfluoro-3-methylbutyl)-2-hydroxypropyl (meth)acrylate, 2-(perfluoro-5-methylhexyl)ethyl (meth)acrylate, 3-(perfluoro-5-methylhexyl)-2-hydroxypropyl (meth)acrylate, 2-(perfluoro-7-methyloctyl)ethyl (meth)acrylate, 3-(perfluoro-7-methyloctyl)-2-hydroxypropyl (meth)acrylate, 1H,1H,3H-tetrafluoropropyl (meth)acrylate, 1H,1H,5H-octafluoropentyl (meth)acrylate, 1H,1H,7H-dodecafluoroheptyl (meth)acrylate, 1H,1H,9H-hexadecafluorononyl (meth)acrylate, 1H-1-(trifluoromethyl)trifluoroethyl (meth)acrylate, and 1H,1H,3H-hexafluorobutyl (meth)acrylate. A compound having both a fluorine-atom-containing functional group and the hydroxyl group is classified not as the acrylic monomer (a2) but as the monomer (a3).

The acrylic-based prepolymer having the hydroxyl group can be obtained for example by a method of radically copolymerizing the acrylic monomer (a1), the acrylic monomer (a2), and the monomer (a3).

In the copolymerization process, it is preferable that, on the basis of a total amount of the monomers (a1), (a2), and (a3), a proportion of the acrylic monomer (a1) is 10 to 80% by mass, a proportion of the acrylic monomer (a2) is 10 to 80% by mass, and a proportion of the monomer (a3) is 0.1 to 20% by mass, and more preferable that the proportion of the acrylic monomer (a1) is 20 to 70% by mass, the proportion of the acrylic monomer (a2) is 20 to 70% by mass, and the proportion of the monomer (a3) is 1 to 15% by mass.

When a copolymerization ratio of the acrylic monomer (a1) exceeds 80% by mass, the proportion of the acrylic monomer (a2) having the hydroxyl group is relatively low. Consequently, the amount of the hydroxyl group that is to react with the acrylic-based monomer (a4) having the isocyanate group for obtaining the prepolymer (A) is low, and a (meth)acryloyl group equivalent of the prepolymer (A) is large. When the (meth)acryloyl group equivalent of the prepolymer (A) is large, the effect of wear resistance improvement of the cured film tends to be small. On the other hand, when the copolymerization ratio of the acrylic monomer (a1) is less than 10% by mass, the amount of the piperidinyl group in the prepolymer (A) decreases and the amount of prepolymer (A) required for expressing excellent weather resistance tends to be high.

When a copolymerization ratio of the acrylic monomer (a2) exceeds 80% by mass, the copolymerization ratio of the acrylic monomer (a1) having the piperidinyl group is relatively low and the effect of weather resistance improvement tends to be small. On the other hand, when the copolymerization ratio of the acrylic monomer (a2) is less than 10% by mass, the (meth)acryloyl group equivalent of the prepolymer (A) is high and the effect of wear resistance improvement of the cured film tends to be low.

The radical copolymerization is performed in a reaction solution containing the respective monomers and a polymerization initiator. The polymerization initiator is selected as suited in accordance with solubility with respect to the monomers, polymerization temperature, targeted molecular weight, etc. As examples of the polymerization initiator, azo-based initiators, such as 2,2'-azobis(isobutyronitrile), 2,2'-azobis(4-methoxy-2,4-dimethylvaleronitrile), 2,2'-azobis(2,4-dimethylvaleronitrile), dimethyl 2,2'-azobis(2-methylpropionate), 2,2'-azobis(2-methylbutyronitrile), 1,1'-azobis(cyclohexane-1-carbonitrile), 2,2'-azobis[N-(2-propenyl)-2-methylpropionamide], 1-[(1-cyano-1-methylethyl)azo]formamide, 2,2'-azobis[N-butyl-2-methylpropionamide], 2,2'-azobis[N-cyclohexyl-2-methylpropionamide], etc., macroazo initiators having a polydimethylsiloxane or polyethylene glycol chain, and peroxides, such as diisobutyl peroxide, di-t-butyl peroxide, benzoyl peroxide, t-butyl 2-ethylhexanoate, 1,1-di-t-butylperoxy-2-methylcyclohexane, etc., can be cited.

An amount of the polymerization initiator with respect to 100 parts by weight of the total amount of the acrylic monomer (a1), the acrylic monomer (a2), and the monomer (a3) is preferably 0.1 to 10 parts by weight. When the amount of the polymerization initiator is less than 0.1 parts by weight, the prepolymer (A) increases in molecular weight and a composition containing it increases in viscosity. In this case, the composition can be decreased in coating aptitude when used as a coating. On the other hand, when the amount of the polymerization initiator is greater than 10 parts by weight, the acrylic-based prepolymer obtained decreases in molecular weight and a proportion of components having no hydroxyl group in the copolymerization reaction product increases. Consequently, components having no (meth)acryloyl group are readily mixed in the reaction product of the prepolymer (A) and the acrylic monomer (a4). In this case, the composition is lowered in curing property and hardness, etc., of the cured film tend to decrease.

The radical copolymerization may be performed in a non-solvent state or in a solvent. As examples of solvents that can be used, toluene, xylene, acetone, methyl ethyl ketone, methyl isobutyl ketone, cyclohexanone, isophorone, methyl acetate, ethyl acetate, propyl acetate, isopropyl acetate, butyl acetate, isobutyl acetate, cyclohexyl acetate, tetrahydrofuran, 1,4-dioxane, propylene glycol monomethyl ether acetate, dietheylene glycol monomethyl ether acetate, methanol, ethanol, 1-propanol, 2-propanol, butanol, and diacetone alcohol can be cited.

Although the temperature during the radical copolymerization may be restricted according to the combination of the solvent boiling point and the initiator in some cases, it is normally 40 to 150° C. and preferably 60 to 100° C.

The acrylic-based prepolymer used for obtaining the prepolymer (A) has a hydroxyl value of preferably 30 to 300 (mgKOH/g) and more preferably 70 to 270 (mgKOH/g). When the hydroxyl value is small, the amount of the (meth)acryloyl group introduced into the prepolymer (A) is low. That is, the (meth)acryloyl group equivalent of the prepolymer (A) is high. In this case, the wear resistance improvement effect of the cured film that is formed tends to be low. On the other hand, when the hydroxyl value of the acrylic-based prepolymer is large, the copolymerization ratio of the acrylic monomer (a1) having the piperidinyl group is low and the weather resistance improvement effect tends to be low.

The acrylic monomer (a4) that is reacted with the acrylic-based prepolymer having the hydroxyl group for obtaining the prepolymer (A) is, for example, at least one kind of compound selected from the group consisting of monofunctional (meth)acrylates, such as 2-(meth)acryloyloxyethyl isocyanate, 2-(2-(meth)acryloyloxyethyloxy)ethyl isocyanate, etc., and polyfunctional (meth)acrylates, such as 1,1-bis ((meth)acryloyloxymethyl)ethyl isocyanate, etc.

Conditions of the reaction of the acrylic-based prepolymer and the acrylic monomer (a4) are adjusted as suited according to the combination of the compounds. In order to prevent reaction of the double bonds belonging to the respective compounds, the reaction temperature is preferably 20 to 110° C. and more preferably 50 to 100° C.

A polymerization inhibitor may be added during the reaction to prevent reaction of the double bonds. As examples of the polymerization inhibitor, phenol or naphthol derivatives, such as hydroquinone (HQ), hydroquinone monomethyl ether (MEHQ), 2,6-di-t-butyl-4-methylphenol (BHT), t-butylcatechol (TBC), and 4-methoxy-1-naphthol, etc., phenothiazine derivatives, and nitrosamine salts can be cited. The same polymerization inhibition effect can also be obtained by blowing in oxygen or air into the reaction system. In a case where the polymerization inhibitor causes coloration or other problems, it is preferable to suppress the amount of the polymerization inhibitor to a low amount and perform the reaction while blowing in oxygen or air.

The prepolymer (A) has a number average molecular weight of preferably 3000 to 100000 and more preferably 5000 to 50000. A large amount of components having no (meth)acryloyl group tends to become mixed in a prepolymer (A) of low number average molecular weight. In this case, the active energy ray-curing composition is lowered in curing property and the cured film tends to be lowered in hardness, etc. On the other hand, when the number average molecular weight of the prepolymer (A) is excessively high, the composition becomes too high in viscosity and the composition may decrease in coating aptitude when used as a coating. In many cases, the molecular weight of the acrylic monomer (a4) hardly influences the number average molecular weight of the prepolymer (A) and it is thus preferable that the acrylic-based prepolymer having the hydroxyl group, which may be said to be a precursor of the prepolymer (A), has a number average molecular weight of 3000 to 100000 as well. In the present specification, the number average molecular weight is a standard polystyrene equivalent value determined by GPC measurement.

The prepolymer (A) preferably has a functional group equivalent of the piperidinyl group (piperidinyl group equivalent) of 200 to 7000 and more preferably 300 to 4000. Also, the prepolymer (A) preferably has a functional group equivalent of the (meth)acryloyl group ((meth)acryloyl group equivalent) of 250 to 1600 and more preferably 300 to 1000. Here, the "functional group equivalent" refers to a mass (g) of the prepolymer (A) per one mole of each functional group.

The active energy ray-curing compound (B) has a benzotriazole group and a (meth)acryloyl group. The benzotriazole group serves a function of converting energy of ultraviolet rays to heat energy and thereby suppressing breakage of chemical bonds in the cured film. The benzotriazole group is a monovalent group expressed, for example, by the following chemical formula.

[Chemical Formula 2]

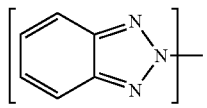

The compound (B) is, for example, at least one kind of compound selected from the group consisting of 2-(2'-hydroxy-5'-(methacryloyloxyethyl)phenyl)-2H-benzotriazole, 2-(2'-hydroxy-3'-t-butyl-5'-methacryloxyethylphenyl)-2H-benzotriazol e, 2-(2'-(meth)acryloyloxy-5'-methylphenyl) benzotriazole, 2-(2'-(meth)acryloyloxy-5'-t-octylphenyl) benzotriazole, and 2-(2'-(meth)acryloyloxy-3',5'-di-t-butylphenyl)benzotriazole.

As the active energy ray-curing compound (C), various compounds having a (meth)acryloyl group is used. Preferably, an active energy ray-curing compound (C1) having a group expressed by —$(CH_2)_5$— and a (meth)acryloyl group is used. The group expressed by —$(CH_2)_5$— is preferably introduced as a bivalent group derived from a caprolactone and expressed by the following chemical formula.

[Chemical Formula 3]

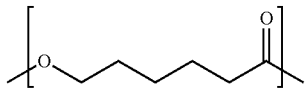

The compound (C1) is preferably a compound expressed by the general formula (1) cited above. In the formula (1), $R^1$ indicates a hydrogen atom or a methyl group, and a plurality of $R^1$ in the same molecule may be the same or different. n, m, l, o, p, and q indicate integers satisfying n+m+l+o+p+q=1 to 12. If n+m+l+o+p+q is less than 1, the coating film tends to peel off readily in a long-term weather resistance test. From the same standpoint, n, m, l, o, p, and q are preferably such that n+m+l+o+p+q is no less than 6. On the other hand when n+m+l+o+p+q exceeds 12, the (meth)acryloyl group equivalent in the compound (C1) increases, the wear resistance of the cured film formed decreases, and the hardness of the cured film tends to be difficult to maintain. The compound expressed by the general formula (1) may be obtained, for example, by a method of further adding (meth)acrylic acid to an adduct of dipentaerythritol and ε-caprolactone.

The curing composition according to the present embodiment may further contain, as the compound (C), an active energy ray-curing compound (C2) having no group expressed by —$(CH_2)_5$—.

As the compound (C2), an oligomer having a number average molecular weight of 500 to 10000 is preferable. The compound (C2) is, for example, preferably at least one kind of oligomer selected from among polyester (meth)acrylates, polyurethane (meth)acrylates, epoxy (meth)acrylates, and (meth)acrylated maleic acid modified polybutadienes. Among these, polyurethane (meth)acrylates are particularly preferable.

A number of (meth)acryloyl groups per molecule of the oligomer is preferably 2 to 15 and more preferably 4 to 12 on the average. If the number of (meth)acryloyl groups is less than 2, the hardness of the cured film decreases and the scratch resistance tends to decrease. If the number of (meth) acryloyl groups is greater than 15, strain in the cured film increases due to increase of curing shrinkage. When the strain increases, cracking and peeling of the cured film occur readily during a weather resistance test. Appearance is damaged greatly when cracking and peeling occur.

The curing composition according to the present embodiment may further contain, as the compound (C), a silicone oil (C3) having a (meth)acryloyl group. The silicone oil (C3) contributes to further improvement of the wear resistance of the cured film. As examples of commercially available silicone oils (C3), X-22-164, X-22-164AS, X-22-164A, X-22-164B, X-22-164C, X-22-164E, X-22-174DX, X-22-2426, X-22-2475, and X-22-2458 (all made by Shin-Etsu Chemical Co., Ltd.) can be cited.

In the curing composition according to the present embodiment, it is preferable that, on the basis of a total amount of the active energy ray-curing compounds (A), (B), and (C), a proportion of the (A) component is 1 to 50% by mass, a proportion of the (B) component is 1 to 20% by mass, and a proportion of the (C) component is 30 to 95% by mass, and it is more preferable that (A) component:(B) component:(C) component=2 to 45:2 to 15:40 to 90 (% by mass).

In a case where the (C) component includes compounds (C1), (C2), and (C3), it is preferable in the curing composition that, on the basis of the total amount of the active energy ray-curing compounds (A), (B), and (C), the proportion of the (A) component is 1 to 50% by mass, the proportion of the (B) component is 1 to 20% by mass, a proportion of the (C1) component is 5 to 60% by mass, a proportion of the (C2) component is 20 to 80% by mass, and a proportion of the (C3) component is 0.01 to 2% by mass, and it is more preferable that (A) component:(B) component:(C1) component:(C2) component:(C3) component=2 to 45:2 to 15:10 to 50:30 to 70:0.05 to 1 (% by mass).

From the standpoint of realizing high hardness and improved wear resistance in the cured film, it is important for the curing composition according to the present embodiment to further contain the inorganic oxide particles (D). An amount of the inorganic oxide particles (D), with respect to 100 parts by weight of the total amount of the active energy ray-curing compounds (A), (B), and (C), is preferably 0.1 to 20 parts by weight and more preferably 0.5 to 15 parts by weight.

As the inorganic oxide particles (D), $SiO_2$ particles are preferable and colloidal silica is more preferable. Specifically, a colloidal solution, such as MEK-ST, IPA-ST, and PGM-ST (all organosilica sols made by Nissan Chemical Industries, Ltd.), in which colloidal silica with a particle diameter of approximately 10 to 100 nm is dispersed in an organic solvent, such as alcohol, ketone, ester, etc., can be cited.

In a case where ultraviolet rays or visible light is used for curing of the curing composition, the active energy ray-curing composition according to the present embodiment further contains a photopolymerization initiator (photoradical generator).

An amount of the photopolymerization initiator, with respect to 100 parts by weight of the total amount of the active energy ray-curing compounds (A), (B), and (C), is preferably 0.1 to 20 parts by weight and more preferably 1 to 10 parts by weight.

The photopolymerization initiator (photoradical generator) is, for example, at least one kind of compound selected from the group consisting of 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, 2-hydroxy-1-{4-[4-(2-hydroxy-2-methylpropionyl)benzyl]phenyl}-2-methylpropan-1-one, 2-methyl-1-(4-methylthiophenyl)-2-morpholinopropan-1-one, 2-benzyl-2-dimethylamino-1-(4-morpholinophenyl)butan-1-one, 2-(dimethylamino)-2-[(4-methylphenyl)methyl]-1-[4-(morpholinyl)phenyl]-1-butanone, 2,4,6-trimethylbenzoyl diphenylphosphine oxide, bis(2,4,6-trimethylbenzoyl)phenylphosphine oxide, bis(η5-2,4-cyclopentadien-1-yl)bis[2,6-difluoro-3-(1H-pyrrol-1-yl)phenyl]titanium, and 1-[4-(phenylthio)phenyl]-1,2-octanedione-2-O-benzoyloxime.

In a case of using electron rays as the active energy rays in the process of curing, addition of a photopolymerization initiator (photoradical generator) such as the above is not necessarily required.

The curing composition according to the present embodiment may further contain a thermoplastic resin, thermosetting resin, curing agent, leveling agent, antifoaming agent, dye, pigment, antioxidant, polymerization inhibitor, humectant, viscosity modifier, preservative, antibacterial agent, antiblocking agent, infrared absorber, electromagnetic shielding agent, antistatic agent, etc., as additives. The curing composition may contain a solvent.

The curing composition according to the present embodiment can be used for forming a cured film as a protective film that coats a surface of various molded bodies.

Molded bodies of glass, ceramics, polycarbonate, polyester, urethane, acryl, polyacetate cellulose, polyamide, polyimide, polystyrene, epoxy resin, polyolefin, various metals (stainless steel, etc.) can be cited as examples of the molded bodies that is protected by the cured film. In particular, when the curing composition according to the present embodiment is used to coat a resin molded body surface that is poor in weather resistance in comparison to glass and ceramics, weather resistance can be imparted and use can be made of lightness, softness, and other characteristics unique to resin molded bodies and are not present in glass substrates. The curing composition according to the present embodiment can be particularly preferably used for forming the cured film to protect the polycarbonate resin molded body.

The molded body protected by the cured film may have a flat shape like that of a film, sheet, or plate or may have a three-dimensional shape of large height or thickness. In a case where the molded body has a flat shape, the cured film may be formed on one surface or both surfaces thereof. The cured film may coat a portion of a molded body surface or may cover an entire surface.

FIG. 1 is a sectional view of an embodiment of a polycarbonate resin molded body with cured film. The polycarbonate resin molded body 10 with cured film shown in FIG. 1 includes a plate-like polycarbonate resin molded body 1 and a cured film 5 disposed on a surface of the polycarbonate resin molded body 1. The cured film 5 has a film thickness of normally approximately 1 to 50 μm. The cured film 5 is formed in direct contact with the surface of the polycarbonate resin molded body 1. Although a primer layer may be disposed between the cured film 5 and the molded body 1, the cured film 5 is excellent in adhesion to the polycarbonate resin molded body 1 and thus a primary layer is not necessarily required.

The polycarbonate resin molded body with cured film 5 may be obtained by a method that includes a step of forming a film of the active energy ray-curing composition according to the present embodiment and a step of forming the cured film 5 by curing the formed film by irradiation of active energy rays. The film of the curing composition may be formed by coating the curing composition. In a case where the curing composition contains a solvent, the solvent is removed by heating from the curing composition coated on the molding body 1 before irradiation of the active energy rays.

EXAMPLES

The present invention shall now be described more specifically by way of examples. However, the present invention is not restricted to the examples. In the following description, "parts" and "%" are based on mass unless noted in particular otherwise.

Details of abbreviations and product names indicated in the respective manufacturing examples and examples are as follows.

"LA87": 3-(2,2,6,6-tetramethyl-4-piperidinyl)-2-methyl-1-propen-3-one (Adeka Stab LA Series, made by Adeka Corporation)

"FAMAC-4": 2-(perfluorobutyl)ethyl methacrylate (made by Unimatec Co., Ltd.)

"MMA": methyl methacrylate

"4HBA": 4-hydroxybutyl acrylate

"Karenz AOI": (2-acryloyloxyethyl isocyanate, made by Showa Denko K. K.)

"RUVA93": 2-(2'-hydroxy-5'-methacryloyloxyethylphenyl)-2H-benzotriazole (made by Otsuka Chemical Co., Ltd.)

"DPCA60": (meth)acrylation product of an adduct of dipentaerythritol and ε-caprolactone (compound with which n+m+l+o+p+q=6 in general formula (1))

"UA-1100H": urethane oligomer (made by Shin-Nakamura Chemical Co., Ltd., Mn=764, number of functional groups=6)

"X-22-2458": reactive modified silicone oil (made by Shin-Etsu Chemical Co., Ltd.)

"PGM-ST": colloidal silica (made by Nissan Chemical Industries, Ltd.)

"Irgacure 184": 1-hydroxycyclohexyl phenyl ketone (made by Ciba Japan Ltd.)

"AIBN": 2,2'-azobis(isobutyronitrile)

"EHQ": hydroquinone monomethyl ether (made by Wako Pure Chemical Industries Co., Ltd.)

"DBTDL": dibutyltin dilaurate (made by Wako Pure Chemical Industries Co., Ltd.)

Manufacturing Example 1

A reaction tank of a reaction container equipped with a stirrer, a thermometer, a reflux condenser, a dripping apparatus, and a gas introduction tube was charged with 250 parts of cyclohexanone and stirring at 80° C. was performed for 1 hour while blowing in nitrogen gas. 100 parts of LA87 as the monomer (a1), 125 parts of 4HBA as the monomer (a2), 25 parts of MMA as the monomer (a3), 7.5 parts of AIBN, and 80.9 parts of cyclohexanone were charged into a dripping tank and then dripped into the reaction tank over a period of 2 hours while stirring the contents of the dripping tank. After the end of dripping, the dripping tank was washed with 34.7 parts of cyclohexanone and the washing liquid was then placed in the reaction tank. After letting react for another 2 hours, a solution in which 2.5 parts of AIBN were dissolved in 22.5 parts of cyclohexanone was divided into three equal portions that were added on three occasions 30 minutes apart. 1 hour after the third addition, the reaction liquid was cooled and taken out and a cyclohexanone solution of an acrylic-based prepolymer having a hydroxyl group was thereby obtained. The solids percentage was 39.56%. The hydroxyl value of the prepolymer was 185 (mgKOH/g).

The reaction tank was charged with 137.6 parts of the cyclohexanone solution of the acrylic-based prepolymer, 0.05 parts of MEHQ as a polymerization inhibitor, 0.17 parts of DBTDL as a catalyst, and 39.6 parts of cyclohexanone, and stirring at 60° C. was performed for 1 hour while blowing in dry air. Karenz AOI of an amount corresponding to 1 mole of the isocyanate group with respect to 1 mole of the hydroxyl group in the acrylic-based prepolymer was placed in the dripping tank as the monomer (a4) and dripped into the reaction tank over a period of 1 hour. When IR measurement of the reaction liquid was performed 3 hours after the end of dripping, a peak due to the isocyanate group disappeared and the reaction liquid was thus cooled and taken out. A solution of the active energy ray-curing prepolymer A1 with a solids percentage of 41.53% was thereby obtained.

The active energy ray-curing prepolymer A1 had a number average molecular weight Mn of 10000, a piperidinyl group equivalent of 842, and a (meth)acryloyl group equivalent of 430. The number average molecular weight Mn was determined as a polystyrene equivalent value using a GPC (gel permeation chromatography).

Manufacturing Example 2 and Manufacturing Example 3

Comparative Manufacturing Examples 1 and 2

Besides changing the types and amounts of the monomers (a1) to (a4) as shown in Table 1, solutions of active energy ray-curing prepolymers A2 to A5 were obtained in the same manner as in Manufacturing Example 1.

Example 1

The active energy ray-curing prepolymer A1 solution (containing the 10 parts by weight of solids) obtained in Manufacturing Example 1, 10 parts by weight of RUVA93, 40 parts by weight of DPCA60, 40 parts by weight of UA1100H, 7.5 parts by weight of PGM-ST, and 3 parts by weight of Irgacure 184 were mixed to obtain an active energy ray-curing composition.

The active energy ray-curing composition was coated by a bar coater onto a commercially available polycarbonate plate (made by Takiron Co., Ltd.). The coating film was dried by heating at 120° C. for 3 minutes using a hot air drying oven. Immediately thereafter, the coating film was cured by UV irradiation using a UV irradiation apparatus at conditions of a peak illuminance of 750 mW/cm$^2$ and an integrated light quantity of 1000 mJ/cm$^2$ to obtain a cured film with a film thickness of approximately 10 μm. Wear resistance and weather resistance of the cured film were evaluated by methods described below. The evaluation results are shown in Table 2.

Examples 2 to 8

Comparative Examples 1 to 6

In likewise manner as in Example 1, active energy ray-curing compositions and cured products were obtained in accordance with prescriptions shown in Tables 2 to 4 and were evaluated in the same manner.

TABLE 1

| | | Manufacturing Example 1 | Manufacturing Example 2 | Manufacturing Example 3 | Comp. Manufacturing Example 1 | Comp. Manufacturing Example 2 |
|---|---|---|---|---|---|---|
| Active energy ray-curing prepolymer (A) | | A1 | A2 | A3 | A4 | A5 |
| Acrylic monomer (a1) | Piperidinyl group | | LA87 | | — | |
| Acrylic monomer (a2) | Hydroxyl group | | | 4HBA | | |
| Acrylic monomer (a3) | Fluorine-atom-containing functional group | — | FAMAC-4 | — | FAMAC-4 | — |
| | Other functional group | MMA | — | MMA | — | — |
| Acrylic monomer (a4) | Isocyanate group | | | AOI | | |
| Composition ratio of prepolymer (% by mass) a1/a2/a3 | | 40/50/10 | 40/50/10 | 10/80/10 | 0/90/10 | 0/100/0 |
| Hydroxyl value of prepolymer (mgKOH/g) | | 185 | 185 | 299 | 336 | 374 |
| Number average molecular weight Mn | | 10000 | 11000 | 15000 | 16000 | 9000 |
| Piperidinyl group equivalent | | 842 | 842 | 4037 | — | — |
| Fluorine-atom-containing functional group equivalent | | — | 4754 | — | 6013 | — |
| (Meth)acryloyl group equivalent | | 430 | 430 | 323 | 302 | 286 |

1) Wear Resistance

The wear resistance of each cured film was evaluated by a method complying with ASTM D-1044. Specifically, a Taber wear tester (made by Taber Industries) was used to carry out a wear test of performing 500 rotations at a load of 500 g using two abrasive wheels (CS-10F), and a change of haze (ΔH) before and after the test was measured using a haze meter (made by Nippon Denshoku Industries Co., Ltd.). Wear resistance was evaluated as being better the lower the ΔH.

2) Weather Resistance 5000 hours of an accelerated test was performed using a carbon arc type sunshine weather meter in compliance with JIS K5400. During the test, the state of each cured film was visually observed when suitable and the times at which cracking and spontaneous peeling were confirmed were recorded respectively. The longer the time, the better the weather resistance. The weather resistance of each cured film was judged according to the following standards.

AA: Neither cracking nor spontaneous peeling occurred even after 5000 hours.

A: The shorter of the times of occurrence of cracking and spontaneous peeling was no less than 4000 hours and no more than 5000 hours.

B: The shorter of the times of occurrence of cracking and spontaneous peeling was no less than 3000 hours and less than 4000 hours.

C: The shorter of the times of occurrence of cracking and spontaneous peeling was less than 3000 hours.

Each cured film for which neither cracking nor spontaneous peeling occurred even after 5000 hours was then observed visually and a film for which there was no surface soiling was judged as "A" and that for which there was surface soiling was judged as "C."

TABLE 2

| | | Example | | | |
|---|---|---|---|---|---|
| | | 1 | 2 | 3 | 4 |
| Active energy ray-curing prepolymer (A) | Piperidinyl group | A1 | A2 | A3 | A4 |
| | Fluorine-atom-containing functional group | — | contained | — | — |
| Active energy ray-curing compound (B) | Benzotriazole group | | RUVA93 | | |
| Active energy ray-curing compound (C) | Compound (C1) having caprolactone-derived —(CH$_2$)$_5$— | | DPCA60 | | |
| | Compound (C2) having no caprolactone-derived —(CH$_2$)$_5$— | | UA-1100H | | |
| | Reactive silicone compound | | — | | |
| Inorganic oxide particles (D) | SiO2 | | PGM-ST | | |
| Photopolymerization initiator | | | Irgacure 184 | | |
| Composition ratio (weight) A/B/C1/C2 | | 10/10/40/40 | | 20/10/30/40 | 1/10/44/45 |
| Wear resistance ΔH | % | 8.7 | 8.3 | 9 | 8 |
| Weather resistance (cracking) | hour | >5000 | >5000 | >5000 | >5000 |

TABLE 2-continued

| | | Example | | | |
|---|---|---|---|---|---|
| | | 1 | 2 | 3 | 4 |
| Weather resistance (spontaneous peeling) | hour | >5000 | >5000 | >5000 | >5000 |
| Judgment | | AA | AA | AA | AA |
| Weather resistance (surface soiling) | | A | A | A | A |

TABLE 3

| | | Example | | |
|---|---|---|---|---|
| | | 6 | 7 | 8 |
| Active energy ray-curing prepolymer (A) | Piperidinyl group | A1 | A2 | A3 |
| | Fluorine-atom-containing functional group | — | contained | — |
| Active energy ray-curing compound (B) | Benzotriazole group | | RUVA93 | |
| Active energy ray-curing compound (C) | Compound (C1) having caprolactone-derived —(CH$_2$)$_5$— | | DPCA60 | |
| | Compound (C2) having no caprolactone-derived —(CH$_2$)$_5$— | | UA-1100H | |
| | Reactive silicone compound | | x-22-2458 | |
| Inorganic oxide particles (D) | SiO2 | | PGM-ST | |
| Photopolymerization initiator | | | Irgacure 184 | |
| Composition ratio (weight) A/B/C1/C2 | | 10/10/40/40 | | 20/10/30/40 |
| Wear resistance ΔH | % | 4.5 | 5.1 | 6.5 |
| Weather resistance (cracking) | hour | >5000 | >5000 | >5000 |
| Weather resistance (spontaneous peeling) | hour | >5000 | >5000 | >5000 |
| Judgment | | AA | AA | AA |
| Weather resistance (surface soiling) | | A | A | A |

TABLE 4

| | | Comparative Example | | | | | |
|---|---|---|---|---|---|---|---|
| | | 1 | 2 | 3 | 4 | 5 | 6 |
| Active energy ray-curing prepolymer (A) | Piperidinyl group | A1 contained | A4 — | A5 — | LA87 | — | A1 contained |
| | Fluorine-atom-containing functional group | — | F | — | — | — | — |
| Active energy ray-curing compound (B) | Benzotriazole group | — | RUVA 93 | RUVA 93 | RUVA 93 | — | RUVA 93 |
| Active energy ray-curing compound (C) | Compound (C1) having caprolactone-derived —(CH$_2$)$_5$— | | | | DPCA60 | | |
| | Compound (C2) not having caprolactone-derived —(CH$_2$)$_5$— | | | | UA-1100H | | |
| | Reactive silicone compound | | | | — | | |
| Inorganic oxide particles (D) | SiO2 | | | PGM-ST | | | — |
| | Photopolymerization initiator | | | | Irgacure 184 | | |
| | Composition ratio (weight) A/B/C1/C2 | 10/0/45/45 | 10/10/40/40 | 10/10/40/40 | 4/10/43/43 | 0/0/50/50 | 10/10/40/40 |
| Wear resistance ΔH | % | 4.5 | 4.5 | 4 | 4.8 | 3 | 12.2 |
| Weather resistance (cracking) | hour | 1500 | 3000 | 2500 | >5000 | 1500 | >5000 |
| Weather resistance (spontaneous peeling) | hour | 2500 | 3000 | 3000 | >5000 | 1500 | >5000 |
| | Judgment | C | B | C | AA | C | AA |
| | Weather resistance (surface soiling) | — | — | — | C | — | A |

From the results shown in Tables 2 to 4, it was confirmed that a cured film having adequately excellent weather resistance and wear resistance can be formed by the present invention.

INDUSTRIAL APPLICABILITY

By coating the active energy ray-curing composition according to the present invention on various parts to form a cured film, the parts can be protected from ultraviolet, etc. The active energy ray-curing composition according to the present invention can be used to form a cured film to protect a surface of a part that is used under an environment in which it is exposed to light like sunlight, etc., or hit by sand and dust, etc. indoors or outdoors. The cured film can be utilized for uses of a building material, a display of a mobile phone, portable game device, portable music player and digital camera, etc., a solar battery panel, a window glass, wood, and papers, etc.

REFERENCE SIGNS LIST

1 . . . polycarbonate resin molded body, 5 . . . cured film, 10 . . . polycarbonate resin molded body with cured film.

The invention claimed is:

1. An active energy ray-curing composition comprising:
   an active energy ray-curing prepolymer (A) obtained by a reaction of an acrylic-based prepolymer having a hydroxyl group and an acrylic monomer (a4) having an isocyanate group and a (meth)acryloyl group;
   an active energy ray-curing compound (B) having a benzotriazole group and a (meth)acryloyl group;
   another active energy ray-curing compound (C) having a (meth)acryloyl group and being different from the (A) component and the (B) component; and
   inorganic oxide particles (D),
   the acrylic-based prepolymer having the hydroxyl group being a copolymer including as monomer units: an acrylic monomer (a1) having a piperidinyl group and a (meth)acryloyl group; an acrylic monomer (a2) having a hydroxyl group and a (meth)acryloyl group; and another monomer (a3).

2. The active energy ray-curing composition according to claim 1, wherein the active energy ray-curing prepolymer (A) has a number average molecular weight of 3000 to 100000.

3. The active energy ray-curing composition according to claim 1, wherein the active energy ray-curing prepolymer (A) has a (meth)acryloyl group equivalent of 250 to 1600.

4. The active energy ray-curing composition according to claim 1, wherein the monomer (a3) comprises a compound having a functional group that contains a fluorine atom.

5. The active energy ray-curing composition according to claim 4, wherein the functional group that contains a fluorine atom is a perfluoroalkyl group.

6. The active energy ray-curing composition according to claim 1, wherein the active energy ray-curing compound (C) comprises a compound (C1) having a (meth)acryloyl group and a group expressed by —(CH$_2$)$_5$—.

7. The active energy ray-curing composition according to claim 6, wherein the compound (C1) having the (meth)acryloyl group and the group expressed by —(CH$_2$)$_5$— is a compound expressed by the following general formula (1)

[Chemical Formula 1]

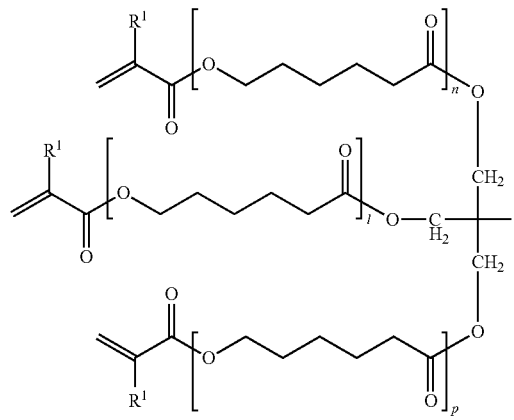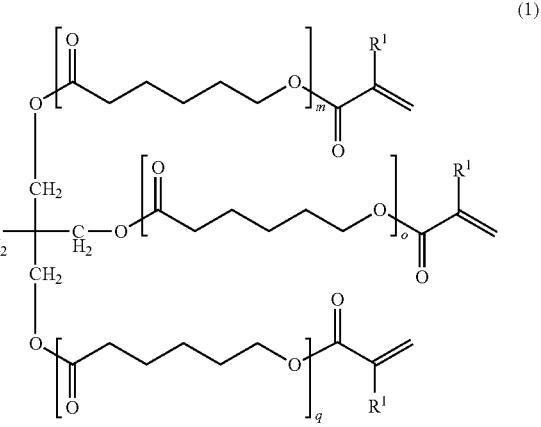

(1)

[In formula (I), $R^1$ indicates a hydrogen atom or a methyl group, a plurality of $R^1$ in the same molecule may be the same or different, and n, m, l, o, p, and q indicate integers satisfying n+m+l+o+p+q=1 to 12.].

8. The active energy ray-curing composition according to claim 7, wherein n, m, l, o, p, and q are integers satisfying n+m+l+o+p+q=6 to 12.

9. The active energy ray-curing composition according to claim 6, wherein the active energy ray-curing compound (C) further comprises a compound (C2) having a (meth)acryloyl group and no group expressed by —(CH$_2$)$_5$—.

10. The active energy ray-curing composition according to claim 9, wherein the compound (C2) having the (meth)acryloyl group and no group expressed by —(CH$_2$)$_5$— is a urethane compound having an average of 2 to 15 (meth)acryloyl groups and a urethane group.

11. The active energy ray-curing composition according to claim 9, wherein the compound (C2) having the (meth)acryloyl group and no group expressed by —(CH$_2$)$_5$— has a number average molecular weight of 500 to 10000.

12. The active energy ray-curing composition according to claim 9, wherein the active energy ray-curing compound (C) further comprises a silicone oil (C3) having a (meth)acryloyl group.

13. The active energy ray-curing composition according to claim 1, wherein the inorganic oxide particles (D) are SiO$_2$ particles.

14. The active energy ray-curing composition according to claim 1, wherein on the basis of the total amount of the (A) component, the (B) component, and the (C) component, a proportion of the (A) component is 1 to 50% by mass, a proportion of the (B) component is 1 to 20% by mass, and a proportion of the (C) component is 30 to 95% by mass.

15. The active energy ray-curing composition according to claim 12, wherein on the basis of the total amount of the (A) component, the (B) component, and the (C) component, a proportion of the (A) component is 1 to 50% by mass, a proportion of the (B) component is 1 to 20% by mass, a proportion of the (C1) component is 5 to 60% by mass, a proportion of the (C2) component is 20 to 80% by mass, and a proportion of the (C3) component is 0.01 to 2% by mass.

16. The active energy ray-curing composition according to claim 1, wherein with respect to 100 parts by weight of the total amount of the (A) component, the (B) component, and the (C) component, an amount of the inorganic oxide particles (D) is 0.1 to 20 parts by weight.

17. A polycarbonate resin molded body with cured film comprising:
a polycarbonate resin molded body; and
a cured film disposed on a surface of the polycarbonate resin molded body and formed by curing of the active energy ray-curing composition according to claim 1.

18. A method for manufacturing a polycarbonate resin molded body with cured film, the method comprising:
a step of forming a film of the active energy ray-curing composition according to claim 1 on a surface of a polycarbonate resin molded body; and
a step of curing the formed film by irradiation of active energy rays to form a cured film.

* * * * *